United States Patent
Byren

[11] Patent Number: 6,014,391
[45] Date of Patent: Jan. 11, 2000

[54] THERMALLY IMPROVED SLAB LASER PUMP CAVITY APPARATUS WITH INTEGRAL CONCENTRATOR AND METHOD OF MAKING SAME

[75] Inventor: Robert W. Byren, Hermosa Beach, Calif.

[73] Assignee: Raytheon Company, Lexington, Mass.

[21] Appl. No.: 08/994,422

[22] Filed: Dec. 19, 1997

[51] Int. Cl.[7] .................................................. H01S 3/04
[52] U.S. Cl. ........................... 372/34; 372/36; 372/69; 372/70; 372/72; 372/75
[58] Field of Search .................... 372/34, 36, 66, 372/69, 72, 75, 70

[56] References Cited

U.S. PATENT DOCUMENTS

| | | | |
|---|---|---|---|
| 3,665,335 | 5/1972 | Tomiyasu | 372/34 X |
| 3,805,186 | 4/1974 | Woodcock | 372/34 X |
| 4,918,703 | 4/1990 | Kukla | 372/66 |
| 4,933,946 | 6/1990 | Kuper et al. | 372/34 |
| 4,949,346 | 8/1990 | Kuper et al. | 372/36 |
| 5,031,184 | 7/1991 | Greve et al. | 372/34 |
| 5,272,710 | 12/1993 | Sumida et al. | 372/35 |
| 5,299,213 | 3/1994 | Kuba et al. | 372/35 |
| 5,485,482 | 1/1996 | Selker et al. | 372/75 |
| 5,572,541 | 11/1996 | Suni | 372/70 |
| 5,619,522 | 4/1997 | Dube | 372/34 X |
| 5,651,021 | 7/1997 | Richard et al. | 372/92 |
| 5,774,489 | 6/1998 | Moulton et al. | 372/70 |
| 5,875,206 | 2/1999 | Chang | 372/75 |

FOREIGN PATENT DOCUMENTS

| | | | |
|---|---|---|---|
| 63157194 | 10/1990 | Japan | 372/34 X |
| 021463493 | 7/1992 | Japan | 372/34 X |

Primary Examiner—Brian Healy
Attorney, Agent, or Firm—Colin M. Raufer; Leonard A. Alkov; Glenn H. Lenzen, Jr.

[57] ABSTRACT

Methods and apparatus for improving the thermal performance of a slab laser pump cavity is provided. Absorbing regions placed on either side of an active lasing region through which the active region is pumped provides uniform heat dissipation across the width of the slab thereby providing one-dimensional heat flow perpendicular to the broad surfaces of the lasing medium and maintaining uniform lensing and birefringence. Foreshortened cold plates in thermal communication with the active lasing region also provide improved thermal performance by providing uniform one-dimensional heat flow perpendicular to the broad surfaces of the lasing slab. In addition, a compliant thermal interface of variable thickness is provided to also improve the distribution of heat flow. Further, cooling channels located within the cold plates are located to achieve uniform one-dimensional heat flow.

50 Claims, 4 Drawing Sheets

THERMALLY IMPROVED SLAB LASER PUMP CAVITY APPARATUS WITH INTEGRAL CONCENTRATOR AND METHOD OF MAKING SAME

"This application is related to copending applications filed on the same date herein entitled Laser Pump Cavity Apparatus With Integral Concentrator and Method, U.S. Ser. No. 08/944,423, pending, and Laser Pump Cavity Apparatus With Improved Thermal Lensing Control, Cooling, And Fracture Strength And Method, U.S. Ser. No. 08/994,796, pending, the disclosures of which are hereby incorporated fully herein."

FIELD OF THE INVENTION

The present invention relates generally to the field of lasers and more particularly to methods and apparatus for improved thermal performance of slab lasers.

BRIEF DESCRIPTION OF THE PRIOR ART

Doped-insulator slab lasers are solid state lasers that are used in a variety of applications requiring moderate to high optical output power. The slab lasing material is typically comprised of a host crystal doped with an ion, such as, for example, ytterbium doped yttrium aluminum garnet (Yb:YAG). High power slab lasers employing lasing media with high aspect ratio slab configurations have traditionally been optically pumped through the broad slab faces with one or more linear flashlamps and have been cooled either by forced convection or conduction through the same faces. Face pumping has been necessary due to the low brightness of the flashlamp pumping sources which have precluded pumping through the smaller area ends and edges of the slab. Face cooling is advantageous in high aspect slab lasers to minimize the conduction path through the lasing medium for thermal energy produced by intrinsic and extrinsic nonradiative processes within the medium (quantum defect, quenching, excited state absorption and/or up conversion). Minimizing the thermal conduction path is important in minimizing the average temperature and temperature gradient within the lasing medium, as is discussed later. Because they require optical pumping and cooling through the same slab faces, the traditional flashlamp-pumped slab lasers are necessarily complicated in their design, requiring optically transparent cooling means.

More modern slab lasers are optically pumped by narrow band, high brightness laser diode arrays. The higher brightness of these laser diode pump sources relative to flashlamps allows a high aspect ratio slab to be pumped either through the narrow edges of the slab in directions generally transverse to the laser beam or through the narrow ends of the slab in directions generally co-linear with the laser beam. Edge and end pumping of the slab allows the faces to be cooled without constraining the cooling system to also transmit the pump beam into the slab, thereby simplifying the design. The pumping configuration that results in the optimum absorption and distribution of pump energy in the lasing medium is preferred. A configuration capable of achieving both high absorption and uniform distribution of pump energy in an edge-pumped geometry is described in commonly assigned co-pending, but not yet published, applications entitled "Slab Laser Pump Cavity Apparatus with Integral Connector" U.S. Ser. No. 08/994,423, pending, and "Laser Pump Cavity Apparatus with Improved Thermal Lensing Control, Cooling, and Fracture Strength and Method" U.S. Ser. No. 08/994,796, pending, both of which are incorporated herein by reference. In addition to improving pump efficiency and uniformity, it is essential to efficiently remove the large amount of heat that is generated within the lasing medium.

An increase in the operating temperature within the lasing medium reduces the population inversion that can be achieved for a given level of pumping, thereby reducing efficiency. Reducing the operating temperature of the laser increases the gain and extraction efficiency. More specifically, reducing the operating temperature increases the stimulated emission cross-section of the active lasing medium. This lowers the saturation fluence of the active lasing region which makes it easier to extract the stored energy for Q-switched systems without damaging the optical coatings at the exit surfaces or the bulk lasing material. Similarly, this also lowers the saturation intensity which makes it easier to extract power for continuous and high pulse rate systems without optical damage.

Temperature gradients cause mechanical stress within the lasing medium. When the medium is stressed, the crystal becomes birefringent, and energy in the laser beam if polarized in a direction that is neither along nor orthogonal to the stress gradient will be converted from the desired polarization to an undesired polarization as the beam propagates along the beam axis through the crystal. This induced birefringence is undesirable for many applications. For example, when the crystal faces are cut at the Brewster angle to extract energy of a desired polarization, energy converted to an orthogonal polarization will be internally reflected, resulting in a loss of output efficiency. As another example, in a typical multipass master oscillator power amplifier laser system that uses a straightforward polarizer and 90° polarization rotation means to separate the master oscillator input beam from the amplified output beam, depolarization of the beam due to thermal stress induced birefringence will cause a portion of the output beam to feed back into the master oscillator, potentially damaging the oscillator components, reducing the output power, and imprinting on the output beam a nonuniform intensity profile which adversely affects beam quality. It is therefore desirable to maintain a one-dimensional temperature gradient within the slab and orient the polarization of the beam to be co-linear with or orthogonal to this gradient in order to avoid depolarization due to thermal stress birefringence.

Temperature gradients also cause refraction or bending of the laser beam as it enters, propagates through, and exits the lasing medium. Physical distortion of the lasing medium due to nonuniform thermal expansion produces a lensing effect at the entrance and exit surfaces of the lasing medium. The index of refraction of the medium, which is a function of both the temperature and stress within the medium, varies across the beam producing graded-index lensing within the medium. If the temperature gradient is one dimensional within the slab, i.e. isotherms are parallel to slab faces, the thermal lensing effects can be compensated by means available in the present art. For example, conventional cylindrical lenses can be used to provide a first order correction. Also, the beam can be propagated in a zig zag path via total internal reflection at the faces of the slab as first proposed by Martin and Chernoch, U.S. Pat. No. 3,633,126, issued in 1972, so that the optical path length for all rays within the laser beam is the same thereby cancelling the thermal lensing effect. The beam can also be guided by total internal reflection at the faces, as described in the above mentioned co-pending applications, minimizing the beam spreading within the slab. It is, therefore, desirable to maintain a one-dimensional temperature gradient within the slab in order to permit thermal lensing compensation by available methods.

In side-pumped laser cavity configurations, heat is removed from the lasing medium by cooling mechanisms applied to the broad faces of the slab. Prior art methods for cooling the broad slab faces include air cooling, liquid cooling systems (forced convection and impingement) and conductive cooling through metal heat sinks. Air cooling is limited to lower power lasers due to relatively poor thermal transfer. Liquid cooling requires careful sealing arrangements to prevent leakage that would contaminate the laser pump heat and cause optical damage to surfaces exposed to the beam.

Similarly, the performance of prior art methods that utilize direct contact of metal heat sinks to the solid state pump cavity medium has been less than desirable. Differences between the thermal conductivity and thermal expansion coefficients of the metal and solid state pump cavity medium results in inadequate thermal transfer rates and significant mechanical stress. The above-mentioned co-pending applications describe a composite slab structure with top and bottom cladding layers that are diffusion bonded to the slab-shaped active lasing region. These cladding layers are shaped having outer cylindrical optical focusing surfaces which concentrate the pumplight entering from the edge of the composite slab, thereby providing efficient and uniform pumping across the slab. Because the thickness of the cladding layers varies across the slab, direct cooling of the slab through the outer cylindrical focusing surfaces, either by liquid or solid conductive means, wherein the cooling surface is maintained at a constant is temperature, produces a non-uniform temperature gradient across the active lasing region resulting in a non-uniform thermal lensing and birefringence condition which is difficult to correct externally. The same co-pending application also describes edge cladding regions which improve the optical performance of the concentrator adding to the efficiency and uniformity of pumping. These edge cladding regions, however, provide a thermal conduction path through the edges of the slab which exacerbates the nonuniform temperature gradient near the ends of the slab active lasing region. Thus, there is a need for improved methods and apparatus for cooling a slab laser and controlling the direction of heat flow within the lasing medium to increase operating efficiency and minimize thermally-induced birefringence and lensing.

SUMMARY OF THE INVENTION

Therefore, an object of the present invention is to provide improved methods and apparatus for cooling a slab laser pump cavity and controlling the direction of heat flow within the active lasing region. The present invention provides efficient heat transfer with a uniform temperature gradient across the active lasing region. The present invention may be usefully employed to cause the mechanical stress, birefringence and thermal lensing to be uniform and one-dimensional across the slab. According to one aspect of the present invention, an optically absorbing layer of material is diffusion-bonded to each edge of the active lasing medium through which the laser may be pumped. These absorbing layers are doped with an ion to cause the layers to be strongly absorptive at the wavelength of the pumping energy, but not optically radiative. Thus, these absorbing layers bonded to edges of the active lasing medium do not lase. Rather, they release the absorbed energy in the form of heat. The doping concentration of the absorbing layers is selected to achieve substantial equalization of the heat dissipation per unit volume between the absorbing lasers and the solid state lasing medium. This extends the regions of heat dissipation beyond the edges of the lasing slab. Thus, while fringing of the heat fields may occur near the edges of the absorbing regions, heat flow from the lasing medium is substantially perpendicular to the broad faces of the slab, even near the edges of the active lasing region. This results in a more uniform flow of heat across the cross-section of the slab transverse to the laser beam. Consequently, thermal lensing and birefringence of the laser beam is uniform across the width of the active region and can be compensated using conventional means.

According to another aspect of the invention, applicable to configurations as described in the abovementioned co-pending application, wherein the lasing medium is embedded in an undoped cladding region, cold plates mounted on the broad surface of the cladding region are of a width optimally chosen to control the heat flow from the broad surfaces of the cladding region. Thermal modelling shows that to achieve substantially one dimensional heat flow perpendicular to the broad slab faces, the width of the cold plates should be about equal to the width of the absorbing area of the pump cavity which includes the active region and may also include the absorbing regions described above. Achieving substantially one dimensional heat flow perpendicular to the broad faces of the slab across the width of the active region maintains uniform mechanical stress, birefringence and thermal lensing.

According to another aspect of the present invention, a variable thickness compliant thermal interface is placed between the undoped cladding region and the cold plate. The interface material, which typically comprises indium or gold foil, has a shape and thermal conductance that compensates for the variable thickness of the cladding layer and the difference in thermal conductivities of the cladding material and the cold plates. Variation of the thickness of the compliant thermal interface across the width of the pump cavity results in a uniform one dimensional temperature gradient within the lasing medium.

According to yet another aspect of the present invention, coolant flow channels are positioned within the cold plate structure so that the thermal conductance path through the cold plate from the surface of the pump cavity to the flow channel compensates the non-uniform thermal conductances in the variable thickness cladding region and the conduct (or variable) thickness compliant thermal interface. Proper location of the flow channels across the width of the cold plate results in a uniform one-dimensional temperature gradient within the lasing medium.

All of these features, separately and in combination, result in substantially one dimensional heat flow perpendicular to the broad surfaces of the laser active region in the direction of the primary cooling axis. By propagating the beam polarization vector parallel or perpendicular to the axis of heat flow, depolarization of the beam due to thermal stress birefringence is minimized.

Also, each of the features of the present invention, separately and in combination, result in isothermic surfaces that are substantially planar and parallel to the broad surfaces of the active region over its entire width and length. Therefore, the refractive index of the active medium varies uniformity across the width of the active region and the attendant thermal lensing is readily controlled by cylindrical compensating lenses, light guiding or zig zag propagation of the beam within the active lasing region.

These and additional features and advantages of the present invention will become further apparent and better understood with reference to the following detailed description and attached drawings.

DETAILED DESCRIPTION OF THE PREFERRED EMBODIMENTS

Figure 1:
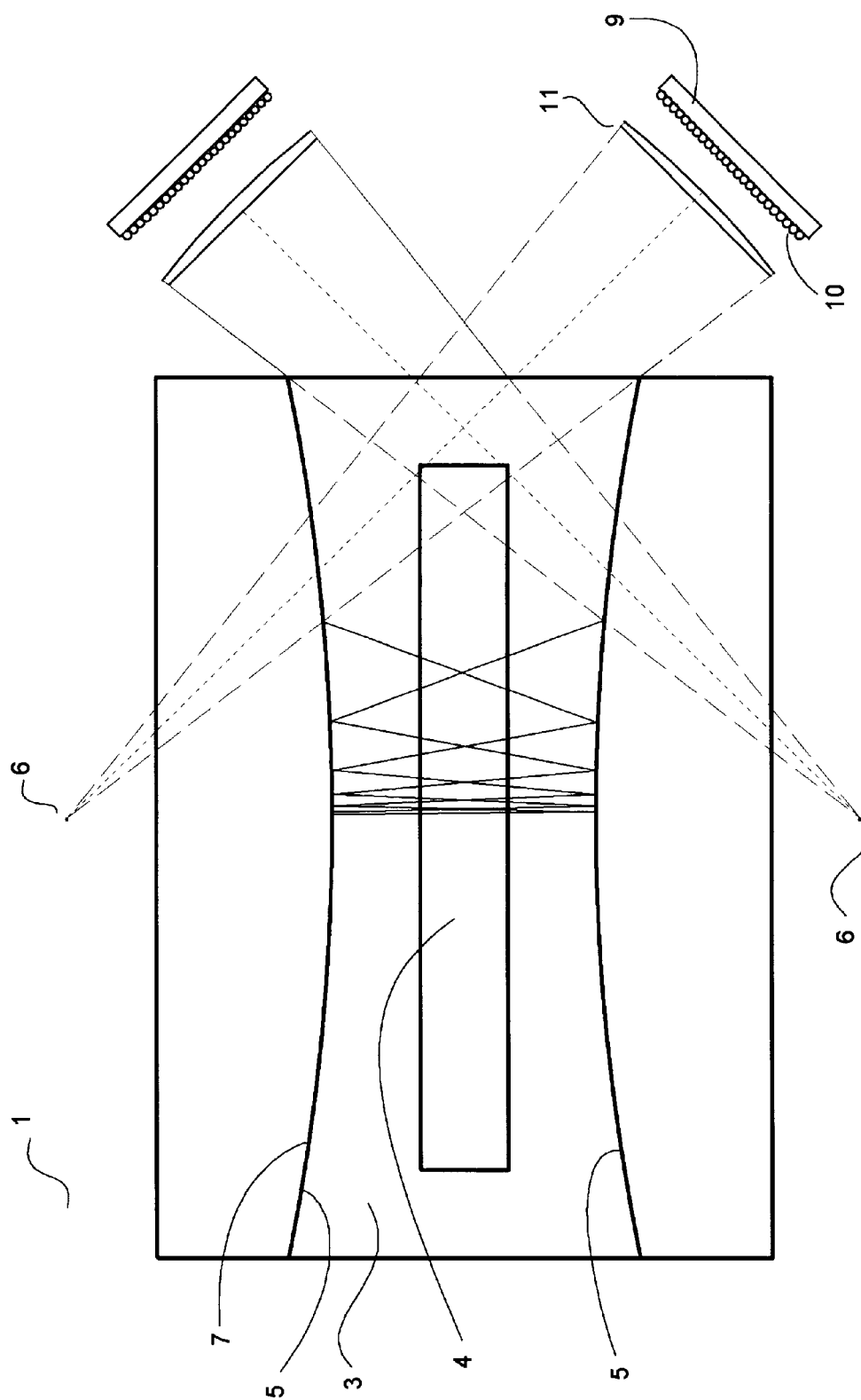
FIG. 1 is a schematic illustration of a slab laser pump cavity apparatus with integral concentrator.

A preferred embodiment of the method and apparatus of the present invention for a thermally improved laser pump cavity comprises the slab laser pump cavity with integral concentrator as described in the above-mentioned co-pending applications. However, persons of ordinary skill in the art will readily recognize that the methods and apparatus of the present invention disclosed herein are applicable to achieving improved thermal performance of other slab laser configurations as well. A slab laser pump cavity with integral concentrator is illustrated schematically in FIG. 1. FIG. 1 depicts a cross section of the laser pump cavity perpendicular to the laser beam axis. The laser pump cavity 1 comprises a doped laser crystal active region embedded, preferably by well known diffusion bonding techniques, within an undoped cladding region 3. Active region 4 is typically a rectangular slab shaped crystal, such as YAG, of high aspect ratio that is doped with an active ion such as $Yb^{3+}$. Undoped cladding region 3 may be formed of the same or different crystal material as active region 4, but is not doped with an active ion. Cladding region 3 exhibits upper and lower substantially hyperboloid surfaces 5 that are concave outward away from active region 4. Depending upon the application for which laser pump cavity 1 is employed, the height of laser pump cavity 1 may be of constant uniform height along the laser beam axis so that the locus of the foci 6 of hyperboloid surfaces 5 are two lines parallel to the laser beam axis.

Laser pump cavity 1 is preferably edge pumped through the narrow edges of active region 4 transverse to the laser beam axis, as shown in FIG. 1, rather than through the upper and lower surfaces of active region 4. Pump energy may be obtained from laser diode arrays 9 with collimating cylindrical microlenses 10. Cylindrical lenses 11 focus the beam along diode pump axes 14 so that the converging rays of pumplight 12, upon refraction at entrance surface 13 of pump cavity 1, are convergently directed toward the line foci 6 of hyperboloid surfaces 5. This pumping configuration is provided on both opposite narrow edges of pump cavity 1, although pumping of only one side is shown in FIG. 1 for simplicity of illustration. Hyperboloid cylindrical surfaces 5 are preferably coated to ensure high reflectivity at the pump wavelength. Because the pump energy is convergently directed toward line foci 6 of hyperboloid surfaces 5, each ray of pump light incident upon one of hyperboloid surfaces 5 is reflected toward the line focus 6 of the opposing hyperboloid surface 5. This process is repeated as the energy of the pump field propagates toward the center of active region 4. The pump field density therefore would tend to increase toward the center of active region 4. However, this increase in energy density is offset by the absorption of pump energy as it propagates through the medium of active region 4. This results in a substantially uniform pump energy distribution throughout the width of active region 4. A more detailed description of the concentration of pump energy is given in the above-referenced co-pending applications.

Adjacent to and in direct contact with hyperboloid cylindrical surfaces 5 of cladding region 3 are compliant thermal interfaces 7. Compliant thermal interfaces 7 are typically comprised of indium or gold foil. Adjacent to and in direct contact with compliant thermal interfaces 7 are cold plates 8, which preferably are made of an aluminum alloy. The shape of the surfaces of cold plates 8 that are in contact with compliant thermal interfaces 7 are substantially conformal to the shape of hyperboloid cylindrical surfaces 5. Heat from active region 4 is transferred to cladding region 3. Compliant thermal interfaces 7 serve to facilitate heat transfer from cladding region 3 to cold plates 8.

Figure 2:
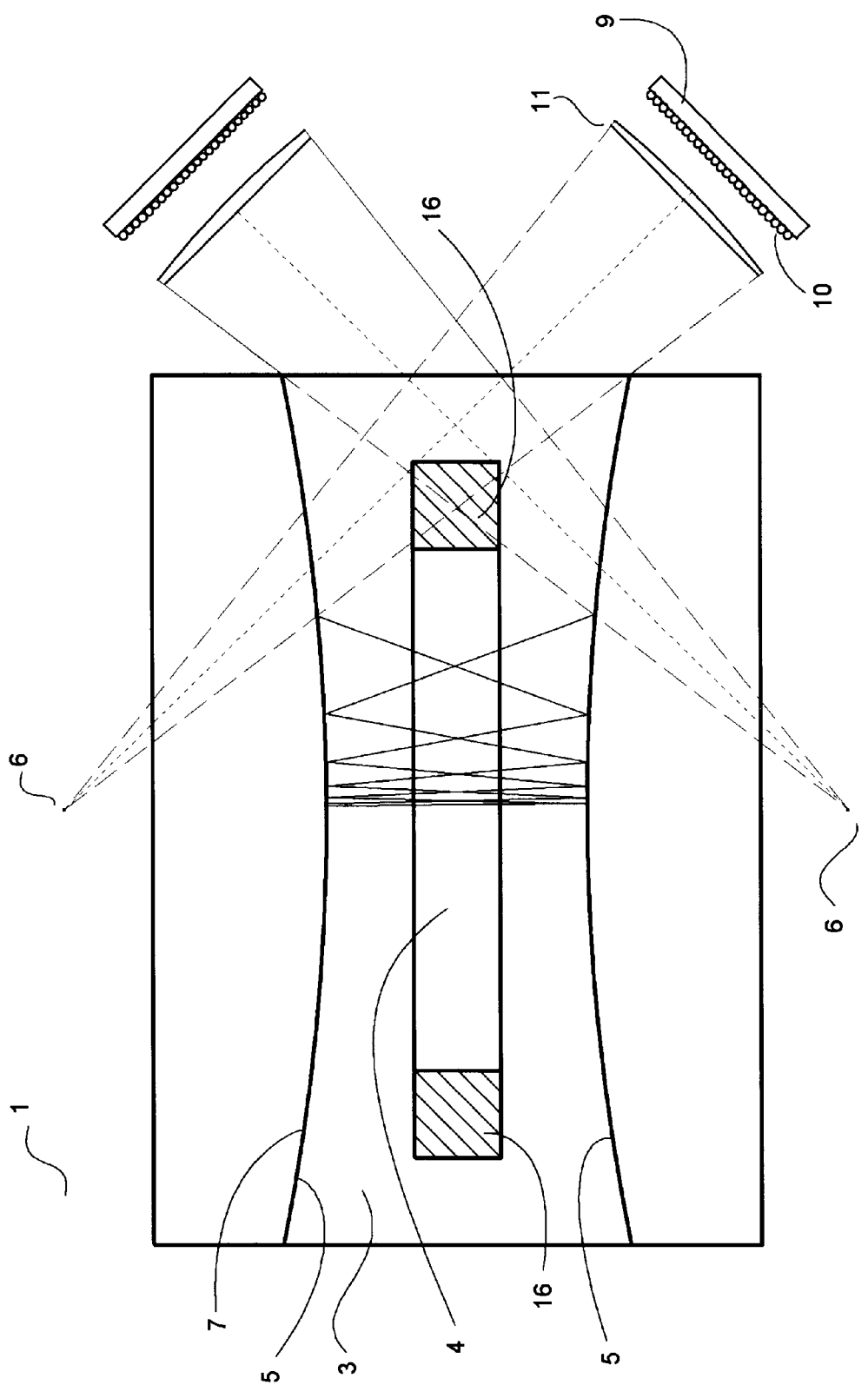
FIG. 2 is an illustration of a laser pump cavity with absorbing regions at the slab edges.

A preferred embodiment of the present invention is shown in FIG. 2, which illustrates absorbing regions 16 at each edge of active region 4. Absorbing regions 16 are preferably diffusion bonded to active region 4 within cladding region 3. Absorbing regions 16 are preferably comprised of the same crystal host material that comprises active region 4. However, unlike active region 4, absorbing regions 16 are doped with ions such that the absorbing regions 16 absorb energy at the pump wavelength, but release energy in the form of heat rather than optical energy. A doping ion suitable for a Yb:YAG active region pumped at 940 nm is chromium ($Cr^{4+}$) in YAG. The doping concentration of absorbing regions 16 is selected such that the heat dissipation per unit volume within the absorbing layers 16 is about equal to the heat dissipation per unit volume within the active lasing region 4. This can be achieved, for example, by doping concentrations of 0.004 atomic percent of $Cr^{4+}$ ions in absorbing regions 16 and 0.36 atomic percent of $Yb^{3+}$ ions in active region 4.

Absorbing regions 16 act to extend the region of one-dimensional uniform heat flow, thereby displacing the area where fringing effects dominate the heat flow 17 away from active region 4, as shown in FIG. 2. Thus, heat flow within active region 4 is perpendicular to its broad surfaces and uniform across its width, thereby causing the induced birefringence and thermal lensing to be uniform and one-dimensional across the slab. By propagating the beam polarization vector parallel or perpendicular to the axis of heat flow, depolarization of the beam due to thermal stress birefringence is minimized. This approach is particularly attractive for ions with a low heating fraction, such as ytterbium (Yb). For Yb:YAG, the heating fraction —the ratio of heat generated in the crystal to absorbed pump power—has been measured, and found to be near the Manley-Rowe limit of 8.6%. For the case of a 10:1 aspect ratio slab, for example, 10 centimeters (cm) wide by 1 cm high, of Yb:YAG and absorbing regions that have a 1:1 aspect ratio, for example, 1 cm wide by 1 cm high, the loss in pumplight required to pump the absorbing regions 16 is only 2×0.086×(1/10)=0.017 or 1.7%. This loss is almost insignificant in determining pump cavity efficiency. It will be understood by persons of ordinary skill in the art that the use of absorbing regions as described herein is equally applicable to other configurations such as edge-pumped composite pump cavities that are cooled directly by air or liquid, rather than by use of cold plates.

Figure 3:
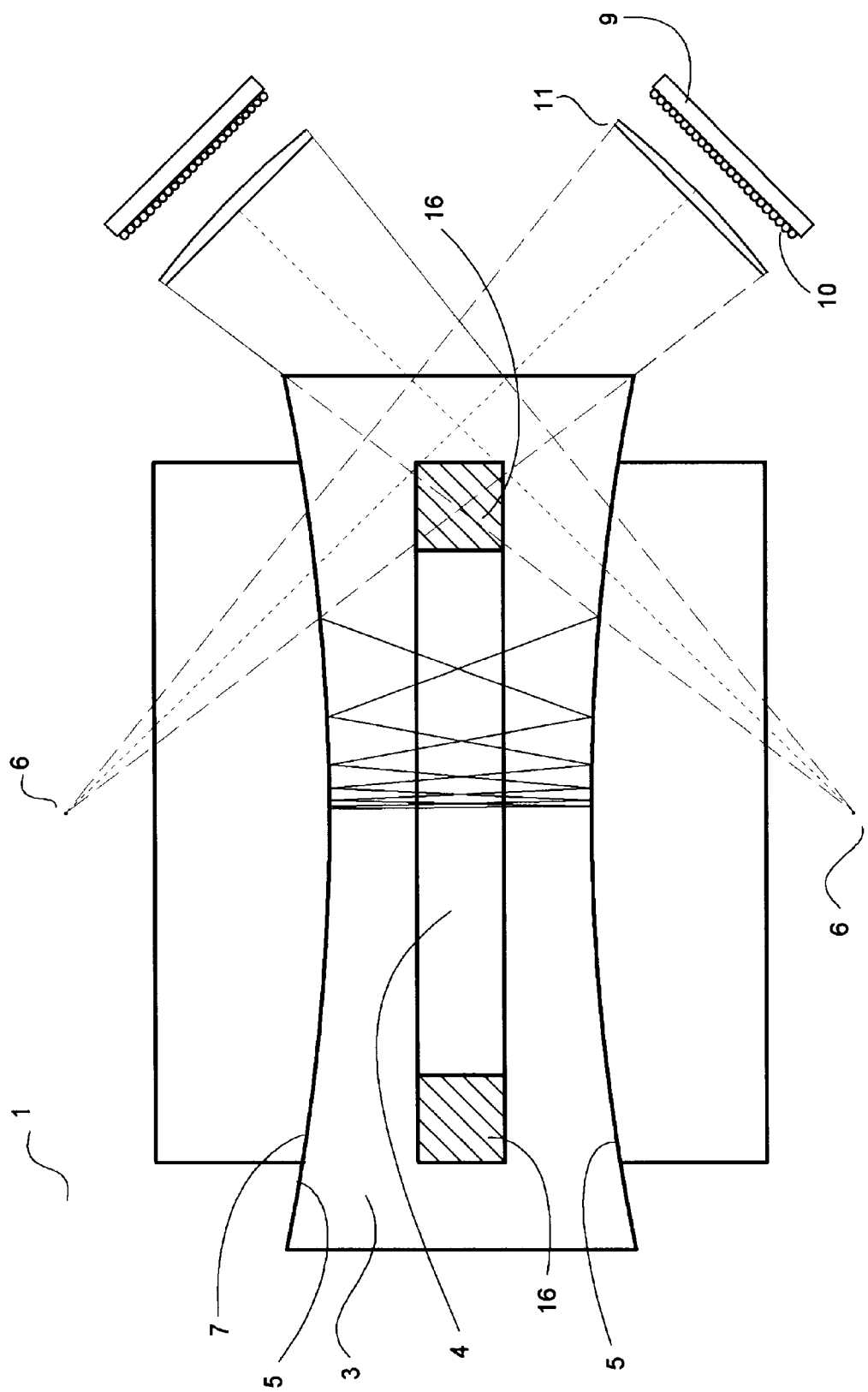
FIG. 3 is an illustration of a laser pump cavity with narrow cold plates.

Another preferred embodiment of the present invention is shown in FIG. 3. Cold plates 8 are narrowed in width to be about the same width as the width of the absorbing area of the pump cavity, which includes active region 4, and may also include absorbing regions 16. This configuration reduces the fringing effects that would otherwise occur near the edges of the active region 4 by altering the direction of heat flow 17 within the undoped cladding region 3 to better approximate one-dimensional uniform heat flow normal to the broad surfaces of active region 4.

In practice, the optimal width of the cold plate 8 is found by thermal modeling through an iterative design process, utilizing commercially available thermal modelling software such as NASTRAN Thermal Analyzer, which implements finite element analysis to computationally solve heat transfer equations subject to boundary conditions for particular user-specified configurations. Use of such software to successfully model and optimize the width of cold plates 8 is well within the skill of persons of ordinary skill in the art. Optimization is achieved when the modeling shows the isotherms near the broad faces of the active region 4 to be nearly planar and parallel to these faces. When this occurs, birefringence and thermal lensing is uniform and readily correctable through means external to the pump cavity.

Figure 4:
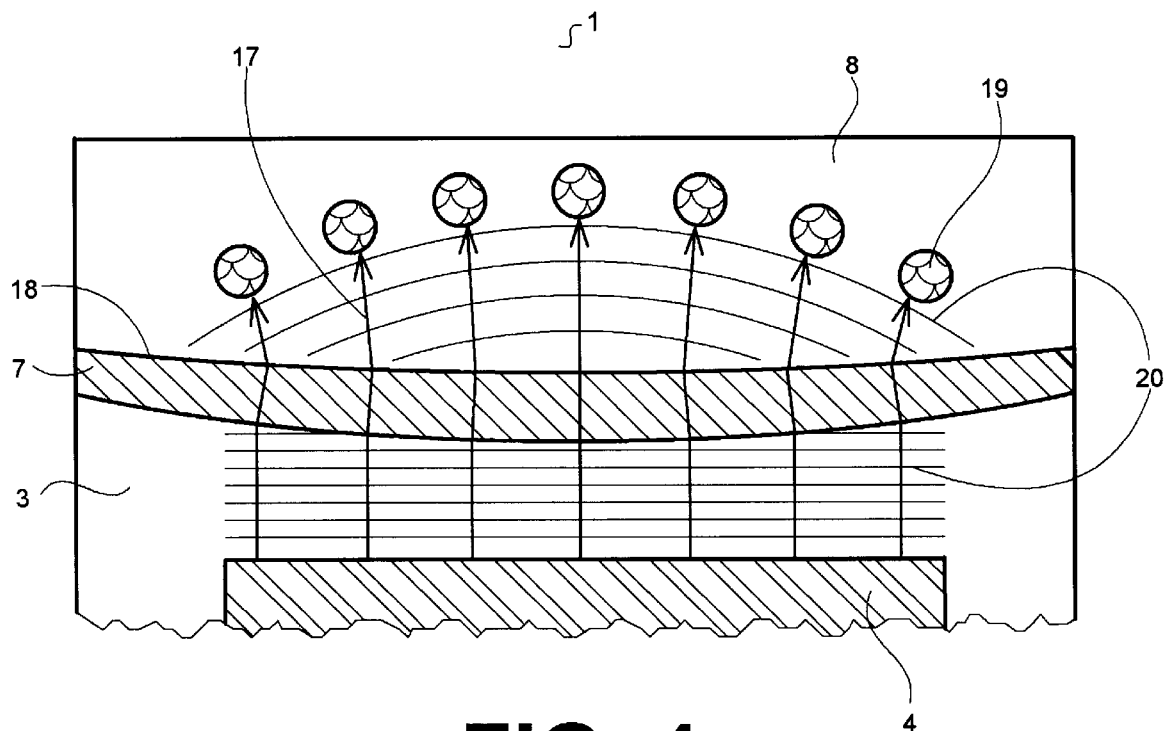
FIG. 4 is an illustration of a laser pump cavity with variable thickness compliant thermal interface.

Another preferred embodiment is illustrated in FIG. 4. In this configuration, cold plate 8 is tailored so that the thermal conductivity of the material forming compliant thermal interface 7, compensates the difference in thermal conductance between the variable thickness cladding layer 3 and the cold plate 8 across the width of the pump cavity. The thickness of compliant thermal interface 7, as determined by the shape of interfacing surface 18, will vary across the width of cold plate 8. Since the thickness of compliant thermal interface 7 determines its thermal conductance, its thermal conductance will vary across the width of the cold plate. The shape of interfacing surface 18 may therefore be tailored such that the series thermal resistance from active region 4 to the heat sink region 19 of cold plate 8 will be substantially constant across the width of the slab. Heat sink region 19 may comprise cooling channels through which any suitable fluid may be caused to flow to remove heat from cold plate 8.

If the heat dissipation is uniform within active region 4 and, if included, absorbing regions 16, and if the isotherms in heat sink region 19 are parallel to the broad faces of active region 4, and if there are no voids in the material forming compliant thermal interface 7 that would give rise to high contact resistances, then the temperature at the surface of active region 4 will be nearly uniform across the width of active region 4, as desired.

In practice, the optimal shape of interfacing surface 18 of cold plate 8 is found by thermal modelling though an interactive design process utilizing commercially available thermal modelling software such as NASTRAN Thermal Analyzer, which implements finite element analysis to computationally solve heat transfer equations subject to boundary conditions for particular user-specified configurations. Use of such software to successfully model and optimize the shape of interfacing surface 18 is well within the skill of persons of ordinary skill in the art. As a first order approximation, the width of compliant thermal interface 7 is chosen such that the series thermal resistance along lines perpendicular to the broad surfaces of the lasing region 4 is constant, according to the formula:

$$R_T = \frac{t_1}{\sigma_1} + \frac{t_2}{\sigma_2} + \frac{t_3}{\sigma_3}$$

where $R_T$ is the thermal series resistance, $t_1$ is the cladding thickness, $t_2$ is the compliant thermal interface thickness, and $t_3$ is the cold plate thickness, $\sigma_1$ is the cladding thermal conductivity, $\sigma_2$ is the compliant thermal interface thermal conductivity, and $\sigma_3$ is the cold plate thermal conductivity.

Refinement of the shape of compliant thermal interface is achieved by iteratively executing the modelling software until isotherms 20 are as nearly plane and parallel to the broad faces of active region 4 as can be achieved. When this occurs, birefringence and thermal lensing is uniform and readily correctable through external means.

Figure 5:
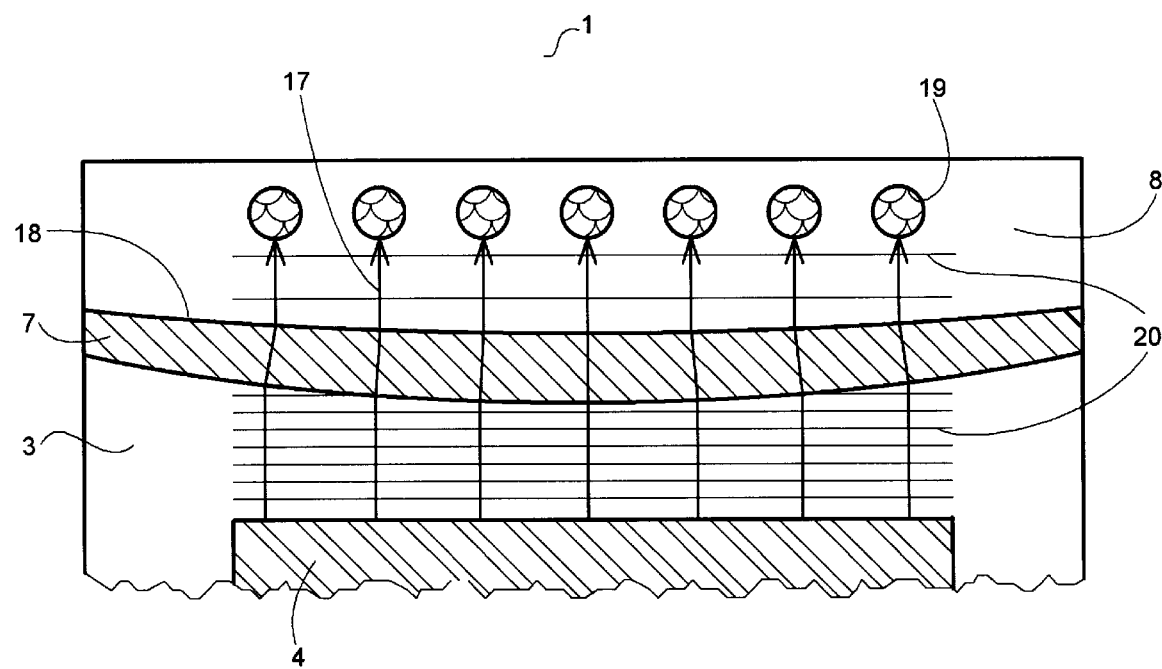
FIG. 5 is an illustration of a laser pump cavity with optimally located coolant channels within the cold plate.

Another preferred embodiment of the present invention is illustrated in FIG. 5. In this embodiment, cooling channels 19 are optimally distributed within cold plate 8 so that the thermal conductance path through cold plates 8 from the surface of active region 4 to cooling channels 19 compensates the non-uniform thermal conductances in the variable thickness cladding region 3 and the constant or variable thickness compliant thermal interfaces 7. Optimum location of the cooling channels 19 across the width of cold plates 8 results in a uniform one-dimensional temperature gradient within active lasing region 4. In practice, the optimum location of cooling channels 19 is found by thermal modelling though an interactive design process utilizing commercially available thermal modelling software such as NASTRAN Thermal Analyzer, which implements finite element analysis to computationally solve heat transfer equations subject to boundary conditions for particular user-specified configurations. Use of such software to successfully model and optimize the location of cooling channels 19 is well within the skill of persons of ordinary skill in the art. As a first order approximation, the location of the cooling channels 19 is chosen such that the series thermal resistance along lines perpendicular to the broad surfaces of the lasing region 4 is constant, according to the formula:

$$R_T = \frac{t_1}{\sigma_1} + \frac{t_2}{\sigma_2} + \frac{t_3}{\sigma_3}$$

where $R_T$ is the thermal series resistance, $t_1$ is the cladding thickness, $t_2$ is the compliant thermal interface thickness, and $t_3$ is the cold plate thickness, $\sigma_1$ is the cladding thermal conductivity, $\sigma_2$ is the compliant thermal interface thermal conductivity, and $\sigma_3$ is the cold plate thermal conductivity, and where the thickness of the coldplate can be measured from the upper surface of compliant thermal interface 7 to the location of the cooling channel. The optimum location will depend upon the materials used and also will be subject to the constraints of mechanical integrity which limit how close the cooling channels may be located to the cladding region. Refinement of the location of cooling channels 19 is achieved by iteratively executing the modelling software until isotherms 20 within cladding region 13 are as nearly planar and parallel to the broad faces of active region 4 as can be achieved. When this occurs, birefringence and thermal lensing is uniform and readily correctable through external means.

All of the features of the present invention, separately and in combination, minimize birefringence and thermal lensing, and reduce the operating temperature of pump cavity 1, thereby improving its performance and longevity.

While this invention has been described with reference to the foregoing preferred embodiments, the scope of the present invention is not limited by the foregoing written description. Rather, the scope of the present invention is limited only insofar as defined by the following claims and equivalents thereof.

I claim:

1. A laser pump cavity apparatus, comprising:
    a doped solid state medium providing an active lasing region having a top surface and a bottom surface and at least two side surfaces surrounding a laser beam axis;

absorbing regions adjacent to said side surfaces; and cladding regions adjacent to said top and bottom surfaces of said solid state medium and said absorbing regions.

2. The apparatus of claim 1, further comprising:

an upper cold plate located above said top surface of said solid state medium with a lower surface in thermal communication with said cladding region; and a lower cold plate located below said bottom surface of said solid state medium with an upper surface in thermal communication with said cladding region.

3. The apparatus of claim 1, wherein said absorbing regions are absorptive at a wavelength of energy at which the solid state medium may be pumped, the absorbing regions releasing absorbed energy in the form of heat.

4. The apparatus of claim 3, wherein the heat dissipation per unit volume of the absorbing regions substantially equals the heat dissipation per unit volume of the solid state lasing medium.

5. The apparatus of claim 2, wherein the surfaces of the upper and lower cold plates in thermal communication with the cladding region are substantially shaped to form opposing hyperboloid cylindrical surfaces, said surfaces defining line foci located exterior to the active lasing region toward which pump energy interior to the active regions may be convergently directed.

6. The apparatus of claim 2, wherein the width of the upper and lower cold plates are each about equal to the width of the active lasing region and absorbing region, to achieve substantially planar isotherms parallel to the top and bottom surfaces of the active lasing region.

7. The apparatus of claim 2, wherein the upper and lower cold plates are each in thermal communication with said cladding region through compliant thermal interfaces between and in contact with the cold plates and the cladding region.

8. The apparatus of claim 7, wherein the thickness of the compliant thermal interfaces varies across the width of the cold plates to achieve substantially planar isotherms parallel to the top and bottom surfaces of the active lasing region.

9. The apparatus of claim 1, wherein the absorbing regions are diffusion bonded to the active lasing region.

10. A laser pump cavity apparatus, comprising:

a doped solid state medium providing an active lasing region having a top surface and a bottom surface and at least two side surfaces surrounding a laser beam axis;

a cladding region surrounding said solid state medium;

an upper cold plate located above said top surface of said solid state medium with a lower surface in thermal communication with said cladding region; and a lower cold plate located below said bottom surface of said solid state medium with an upper surface in thermal communication with said cladding region; and wherein the width of the cold plates are chosen to achieve substantially planar isotherms parallel to the top and bottom surfaces of the active lasing region.

11. The apparatus of claim 10, further comprising absorbing regions adjacent to said side surfaces of the doped solid state medium;

wherein said absorbing regions are absorptive at a wavelength of energy at which the solid state medium may be pumped, the absorbing regions releasing absorbed energy in the form of heat.

12. The apparatus of claim 11, wherein the heat dissipation per unit volume of the absorbing regions substantially equals the heat dissipation per unit volume of the solid state lasing medium.

13. The apparatus of claim 10, wherein the surfaces of the upper and lower cold plates in thermal communication with the cladding region are substantially shaped to form opposing hyperboloid cylindrical surfaces, said surfaces defining line foci located exterior to the active lasing region toward which pump energy interior to the active regions may be convergently directed.

14. The apparatus of claim 10, wherein the upper and lower cold plates are each in thermal communication with said cladding region through compliant thermal interfaces between and in contact with the cold plates and the cladding region.

15. The apparatus of claim 14, wherein the thickness of the compliant thermal interfaces varies across the width of the cold plates, to achieve substantially planar isotherms parallel to the top and bottom surfaces of the active lasing region.

16. The apparatus of claim 10, further comprising cooling channels within said cold plates, said channels located to achieve substantially planar isotherms parallel to the top and bottom surfaces of the active laser region.

17. A laser pump cavity apparatus, comprising:

a doped solid state medium providing an active lasing region having a top surface and a bottom surface and at least two side surfaces surrounding a laser beam axis;

a cladding region surrounding said solid state medium;

an upper cold plate located above said top surface of said solid state medium with a lower surface in thermal communication with said cladding region; and a lower cold plate located below said bottom surface of said solid state medium with an upper surface in thermal communication with said cladding region; and wherein the thermal communication between the cold plates and the cladding region is provided by compliant thermal interfaces of variable thickness between and in direct contact with the cold plates and the cladding region.

18. The apparatus of claim 17, wherein the width of the cold plates are chosen to achieve substantially planar isotherms parallel to the top and bottom surfaces of the active lasing region.

19. The apparatus of claim 17, further comprising absorbing regions adjacent to said side surfaces of the doped solid state medium.

20. The apparatus of claim 19, wherein said absorbing regions are absorptive at a wavelength of energy at which the solid state medium may be pumped, the absorbing regions releasing absorbed energy in the form of heat; and wherein the heat dissipation per unit volume of the absorbing regions substantially equals the heat dissipation per unit volume of the solid state lasing medium.

21. The apparatus of claim 17, wherein the surfaces of the upper and lower cold plates in thermal communication with the cladding region are substantially shaped to form opposing hyperboloid cylindrical surfaces, said surfaces defining line foci located exterior to the active lasing region toward which pump energy interior to the active regions may be convergently directed.

22. The apparatus of claim 17, wherein the thickness of the compliant thermal interfaces varies across the width of the cold plates, to achieve substantially planar isotherms parallel to the top and bottom surfaces of the active lasing region.

23. The apparatus of claim 17, further comprising cooling channels within said cold plates, said channels located to achieve substantially planar isotherms parallel to the top and bottom surfaces of the active laser region.

24. A laser pump cavity apparatus for achieving substantially planar isotherms parallel to broad surfaces of an active lasing region, comprising:

a doped solid state medium providing an active lasing region having a top surface and a bottom surface and at least two side surfaces surrounding a laser beam axis;

absorbing regions adjacent to said side surfaces;

a cladding region surrounding said solid state medium and said absorbing regions;

an upper cold plate located above said top surface of said solid state medium with a lower surface in thermal communication with said cladding region; and a lower cold plate located below said bottom surface of said solid state medium with an upper surface in thermal communication with said cladding region;

cooling channels located within each of said cold plates;

wherein the width of the cold plates are chosen to achieve substantially planar isotherms parallel to the top and bottom surfaces of the active lasing region; and wherein the thermal communication between the cold plates and the cladding region is provided by compliant thermal interfaces of variable thickness between and in direct contact with the cold plates and the cladding region;

wherein the thickness of said compliant thermal interfaces varies across the width of the cold plates; and wherein said cooling channels are located to achieve substantially planar isotherms parallel to the top and bottom surfaces of the active laser region.

25. A method for manufacturing a laser pump cavity apparatus, comprising:

doping a solid state medium with ions to provide an active lasing region having a top surface and a bottom surface and at least two side surfaces surrounding a laser beam axis;

doping a solid state medium with ions to provide absorbing regions adjacent to said side surfaces; and providing a cladding region adjacent to the top and bottom surfaces of said solid state medium and said absorbing regions.

26. The method of claim 25, further comprising the steps of:

providing an upper cold plate located above said top surface of said solid state medium with a lower surface in thermal communication with said cladding region; and providing a lower cold plate located below said bottom surface of said solid state medium with an upper surface in thermal communication with said cladding region.

27. The method of claim 26, wherein the ions for providing absorbing regions are selected to cause the absorbing regions to be absorptive at a wavelength of energy at which the solid state medium may be pumped, the absorbing regions releasing absorbed energy in the form of heat.

28. The method of claim 27, wherein the ions for providing absorbing regions are selected to cause the heat dissipation per unit volume of the absorbing regions to substantially equal the heat dissipation per unit volume of the solid state lasing medium.

29. The method of claim 26, wherein the surfaces of the upper and lower cold plates in thermal communication with the cladding region are substantially shaped to form opposing hyperboloid cylindrical surfaces, said surfaces defining line foci located exterior to the active lasing region toward which pump energy interior to the active regions may be convergently directed.

30. The method of claim 26, wherein the width of the upper and lower cold plates are each made about equal to the width of the active lasing region and absorbing region, to achieve substantially planar isotherms parallel to the top and bottom surfaces of the active lasing region.

31. The method of claim 26, wherein the upper and lower cold plates are each placed in thermal communication with said cladding region through compliant thermal interfaces between and in contact with the cold plates and the cladding region.

32. The method of claim 27, further providing the step of providing cooling channels within said cold plates, said channels located to achieve substantially planar isotherms parallel to the top and bottom surfaces of the active laser region.

33. The method of claim 27, wherein the absorbing regions are diffusion bonded to the active lasing regions.

34. A method for manufacturing a laser pump cavity apparatus, comprising:

doping a solid state medium with ions to provide an active lasing region having a top surface and a bottom surface and at least two side surfaces surrounding a laser beam axis;

providing a cladding region surrounding said solid state medium;

providing an upper cold plate located above said top surface of said solid state medium with a lower surface in thermal communication with said cladding region; and providing a lower cold plate located below said bottom surface of said solid state medium with an upper surface in thermal communication with said cladding region; and wherein the width of the cold plates are chosen to achieve substantially planar isotherms parallel to the top and bottom surfaces of the active lasing region.

35. The method of claim 34, further comprising the step of doping a solid state medium with ions to provide absorbing regions adjacent to said side surfaces of the doped solid state lasing region.

36. The method of claim 35, wherein the ions for providing absorbing regions are selected to cause the absorbing regions to be absorptive at a wavelength of energy at which the solid state medium may be pumped, the absorbing regions releasing absorbed energy in the form of heat.

37. The method of claim 35, wherein the ions for providing absorbing regions are selected to cause the heat dissipation per unit volume of the absorbing regions to substantially equal the heat dissipation per unit volume of the solid state lasing medium.

38. The method of claim 34, wherein the surfaces of the upper and lower cold plates in thermal communication with the cladding region are substantially shaped to form opposing hyperboloid cylindrical surfaces, said surfaces defining line foci located exterior to the active lasing region toward which pump energy interior to the active regions may be convergently directed.

39. The method of claim 34, wherein the upper and lower cold plates are each placed in thermal communication with said cladding region through compliant thermal interfaces between and in contact with the cold plates and the cladding region.

40. The method of claim 39, wherein the thickness of the compliant thermal interfaces is made to vary across the width of the cold plates to achieve substantially planar isotherms parallel to the top and bottom surfaces of the active lasing region.

41. The method of claim 34, further comprising the step of locating cooling channels within said cold plates to achieve substantially planar isotherms parallel to the top and bottom surfaces of the active lasing regions.

42. A method for manufacturing a laser pump cavity apparatus, comprising:
- a doping a solid state medium to provide an active lasing region having a top surface and a bottom surface and at least two side surfaces surrounding a laser beam axis;
- providing a cladding region surrounding said solid state medium;
- providing an upper cold plate located above said top surface of said solid state medium with a lower surface in thermal communication with said cladding region; and
  - providing a lower cold plate located below said bottom surface of said solid state medium with an upper surface in thermal communication with said cladding region; and wherein the thermal communication between the cold plates and the cladding region is provided by compliant thermal interfaces of viable thickness placed between and in direct contact with the cold plates and the cladding region.

43. The method of claim 42, wherein the width of the cold plates are chosen to achieve substantially planar isotherms parallel to the top and bottom surfaces of the active lasing region.

44. The method of claim 42, further comprising the step of doping a solid state medium with ions to provide absorbing regions adjacent to said side surfaces of the doped solid state active region.

45. The method of claim 44, wherein the ions for providing the absorbing regions are selected to provide absorption at a wavelength of energy at which the solid state medium may be pumped, the absorbing regions releasing absorbed energy in the form of heat.

46. The method of claim 44, wherein the ions for providing the absorbing regions are selected to cause heat dissipation per unit volume of the absorbing regions to substantially equal the heat dissipation per unit volume of the solid state lasing medium.

47. The method of claim 42, wherein the surfaces of the upper and lower cold plates in thermal communication with the cladding region are substantially shaped to form opposing hyperboloid cylindrical surfaces, said surfaces defining line foci located exterior to the active lasing region toward which pump energy interior to the active regions may be convergently directed.

48. The method of claim 42, wherein the thickness of the compliant thermal interfaces is made to vary across the width of the cold plates to achieve substantially planar isotherms parallel to the top and bottom surfaces of the active lasing region.

49. The method of claim 44, further comprising the step of locating cooling channels within said cold plates to achieve substantially planar isotherms parallel to the top and bottom surfaces of the active lasing regions.

50. A method for manufacturing a laser pump cavity apparatus, comprising:
- doping a solid state medium with ions to provide an active lasing region having a top surface and a bottom surface and at least two side surfaces surrounding a laser beam axis;
- doping a solid state medium with ions to provide absorbing regions adjacent to said side surfaces;
- providing a cladding region surrounding said solid state medium and said absorbing regions;
- providing an upper cold plate located above said top surface of said solid state medium with a lower surface in thermal communication with said cladding region; and
- providing a lower cold plate located below said bottom surface of said solid state medium with an upper surface in thermal communication with said cladding region;
- providing cooling channels located within each of said cold plates;
- wherein the width of the cold plates are chosen to achieve substantially planar isotherms parallel to the top and bottom surfaces of the active lasing region;
- wherein the thermal communication between the cold plates and the cladding region is provided by compliant thermal interfaces of variable thickness placed between and in direct contact with the cold plates and the cladding region; and
- wherein said cooling channels are located to achieve substantially planar isotherms parallel to the top and bottom surfaces of the active laser region.

* * * * *